United States Patent
Zeyen et al.

[11] Patent Number: 5,938,114
[45] Date of Patent: Aug. 17, 1999

[54] MOTOR VEHICLE HAVING A LATENT HEAT ACCUMULATOR AND METHOD OF CHARGING THE ACCUMULATOR

[75] Inventors: Klaus-Peter Zeyen, Köln; Thomas Pels, Heiden; Klaus Revermann, Lingen; Holger Riekenbrauck, Köln-Nippes, all of Germany

[73] Assignee: Isad Electronics Systems GmbH & Co. KG, Köln, Germany

[21] Appl. No.: 08/923,946

[22] Filed: Sep. 5, 1997

[30] Foreign Application Priority Data

Sep. 9, 1996 [DE] Germany ............... 196 36 523

[51] Int. Cl.⁶ .................................. B60H 1/02
[52] U.S. Cl. ........................ 237/12.3 R; 237/12.1
[58] Field of Search .............. 237/44, 12.3 R, 237/12.1; 180/65.2; 122/26

[56] References Cited

U.S. PATENT DOCUMENTS

| | | | |
|---|---|---|---|
| 4,018,052 | 4/1977 | Laussermair | 60/721 |
| 4,065,055 | 12/1977 | De Cosimo | 237/12.1 |
| 4,098,144 | 7/1978 | Besel et al. | 74/687 |
| 4,264,826 | 4/1981 | Ullmann | 290/2 |
| 4,562,894 | 1/1986 | Yang | 180/65.2 |
| 4,951,769 | 8/1990 | Kawamura | 180/65.4 |
| 5,291,960 | 3/1994 | Brandenburg et al. | 180/65.2 |
| 5,402,046 | 3/1995 | Jeanneret | 318/139 |
| 5,549,524 | 8/1996 | Yang | 477/3 |
| 5,582,262 | 12/1996 | Wust | 180/2.1 |
| 5,635,771 | 6/1997 | Mertl et al. | 307/10.7 |
| 5,644,200 | 7/1997 | Yang | 318/139 |
| 5,773,904 | 6/1998 | Schiebold et al. | 310/92 |
| 5,785,137 | 7/1998 | Reuyl | 180/65.2 |
| 5,788,597 | 8/1998 | Boll et al. | 477/4 |
| 5,794,734 | 8/1998 | Fahl et al. | 180/165 |

FOREIGN PATENT DOCUMENTS

| | | |
|---|---|---|
| 2319155 | 10/1974 | Germany . |
| 196 16 242 | 11/1995 | Germany . |
| 195 32 129 | 3/1997 | Germany . |

*Primary Examiner*—Henry Bennett
*Assistant Examiner*—Derek S. Boles
*Attorney, Agent, or Firm*—Walter Ottesen

[57] ABSTRACT

The invention is directed to a motor vehicle having an internal combustion engine 2 which drives the vehicle via a drive shaft 4. The motor vehicle further includes a latent heat accumulator 18. In addition, the motor vehicle includes an electrical machine 8 which is at least at intervals of time coupled to the drive shaft 4 so that the rotational energy of the drive shaft 4 can be converted into electrical energy with the aid of the electrical machine 8. The electrical energy is supplied to the latent heat accumulator 18 and is there converted into heat energy to charge the latent heat accumulator 18.

7 Claims, 1 Drawing Sheet

MOTOR VEHICLE HAVING A LATENT HEAT ACCUMULATOR AND METHOD OF CHARGING THE ACCUMULATOR

FIELD OF THE INVENTION

The invention relates to a motor vehicle having an internal combustion engine which drives the vehicle via a drive shaft. The vehicle also includes a latent heat accumulator which can be charged via heat developed during operation of the vehicle. The invention also relates to a method for charging a latent heat accumulator disposed on such a vehicle.

BACKGROUND OF THE INVENTION

In motor vehicles, which are driven by internal combustion engines, the engine is cooled with a liquid coolant so that the engine does not exceed a critical temperature. The heated coolant can be conducted through a latent heat accumulator and there transfer its heat so that the accumulator is charged. The latent heat accumulator can store the received heat quantity extremely long (approximately 48 hours) and the stored heat quantity can be used for different purposes. For example, the stored heat can be used to prewarm the engine in advance of starting or to prewarm the passenger compartment and/or to preheat a catalytic converter, et cetera.

In modern motor vehicles, and especially in motor vehicles, which are equipped with modern direct-injecting turbo diesel engines, the efficiency of the engine becomes ever greater, that is, the heat outputted by the engine becomes less. This efficiency is desirable but can lead to a situation wherein the emitted heat of the engine is no longer sufficient to adequately heat the liquid coolant and therefore the latent heat accumulator, so that the accumulator can no longer satisfactorily fulfill its function. A further difficulty is that the heated coolant must be conducted to the latent heat accumulator with the least possible heat loss. For this purpose, the latent heat accumulator either must be positioned as close as possible to the engine, which can introduce problems because of the tight engine compartment of modern motor vehicles or, a longer transport path must be accepted which requires a complex and therefore expensive thermal insulation of this path.

SUMMARY OF THE INVENTION

It is an object of the invention to provide a motor vehicle of the kind described above wherein the latent heat accumulator can always be adequately charged. It is another object of the invention to provide a method which always ensures an adequate charging of the latent heat accumulator.

The motor vehicle of the invention includes: a drive shaft; an internal combustion engine for driving the motor vehicle via the draft shaft; a latent heat accumulator; an electrical machine; the drive shaft being mechanically connected to the electrical machine so as to permit the electrical machine to convert the mechanical energy of the drive shaft into electrical energy; means for conducting the electrical energy from the electrical machine to the latent heat accumulator; and, means for converting at least a portion of the electrical energy into thermal energy and for transferring the thermal energy to the latent heat accumulator.

The advantages achieved with the invention are especially that the charging of the latent heat accumulator can be influenced in a targeted manner and therefore an adequate charge of the accumulator is ensured at every point in time.

Thus, it is, for example possible, to electrically couple the electrical machine to the drive shaft of the motor vehicle for each braking operation so that the drive shaft is electrodynamically braked by the electrical machine and therefore supports the braking operation and converts the mechanical energy of the drive shaft into electrical energy. In general, charging the latent heat accumulator via braking operations is adequate. Should it happen that the charging possibility is however not adequate, for example, for long trips on an expressway or at low ambient temperatures, et cetera, the electrical machine can be electrically coupled in a specific manner to the drive shaft, as required, so that mechanical energy of the drive shaft is converted into electrical energy in a targeted manner. A further advantage of the invention is that the electrical energy, which is derived from the electrical machine, can be transported virtually free of loss utilizing suitable current conductors. Accordingly, the paths between the electrical machine and the latent heat accumulator can be as long as desired so that the latent heat accumulator can be positioned or placed as desired. In this way, the latent heat accumulator can, for example, be placed in the trunk of the motor vehicle which, on the one hand, leaves additional space for other equipment in the engine compartment and, on the other hand, leads to a better distribution of weight in the motor vehicle.

According to another embodiment of the invention, the electrical machine is connected to the latent heat accumulator via an electrical line which has a low ohmic resistance and the electrical energy is converted into heat energy with the aid of a heater resistor which is directly connected to the latent heat accumulator. The advantage of this further embodiment of the invention is seen in that a virtually loss-free transport of electrical energy from the electrical machine to the latent heat accumulator is ensured as is an effective conversion of the electrical energy into thermal energy in the latent heat accumulator.

According to still another embodiment of the invention, the electrical machine is used to reduce rotational irregularities of the drive shaft. Such an additional use of the electrical machine leads especially to a higher driving comfort of the motor vehicle. In this last case, the electrical machine is continuously electrically coupled to the drive shaft.

In addition, the electrical machine can also be used as a starter for the engine so that a separate starter is unnecessary. International patent publication WO 97/08438 corresponds to German patent application 195 32 129.4 and discloses a system wherein the electrical machine is used in this manner.

The electrical machine can be used additionally as a generator for the motor vehicle and therefore replace the conventional generator in the vehicle.

In summary, the coupling of the electrical machine to the drive shaft always ensures an adequate charging of the latent heat accumulator. On the other hand, the mechanical power capacity or drive capacity of the internal combustion engine is not reduced or only very slightly reduced when the electrical machine is coupled to the drive shaft only during braking operations.

In the motor vehicle of the invention, the electrical machine can be operated as a generator in all operating states of the vehicle (braking, driving at constant speed, acceleration) so that a portion of the mechanical energy of the drive shaft is converted into electrical energy and this electrical energy, in turn, is converted into thermal energy for charging the latent heat accumulator.

BRIEF DESCRIPTION OF THE DRAWING

The invention will now be described with reference to the single FIGURE (FIG. 1) of the drawing which shows a schematic of the drive system of the motor vehicle according to the invention.

DESCRIPTION OF THE PREFERRED EMBODIMENTS OF THE INVENTION

Figure 1:
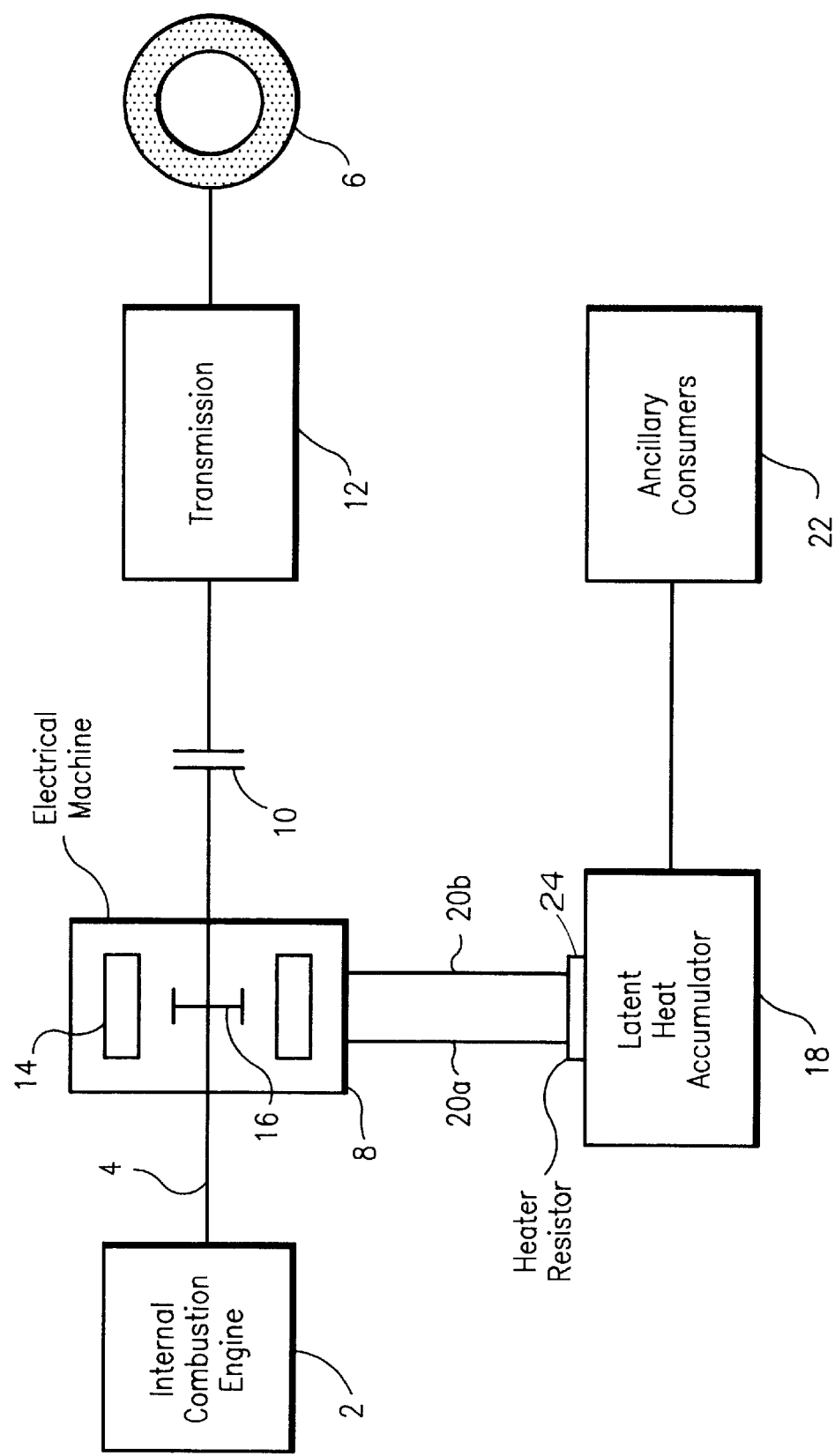

The motor vehicle includes an internal combustion engine 2, a drive shaft 4, a clutch 10 and a transmission 12. The torque of the engine is transmitted to the drive wheels 6 via the drive shaft 4, the clutch 10 and the transmission 12 in a manner known per se. In addition to the above elements, the drive system of the motor vehicle includes an electrical machine 8 having a rotor 16 which is seated directly on the drive shaft 4 of the engine 2 and is connected thereto so as to rotate therewith. In contrast, the stator 14 of the electrical machine 8 is supported on the engine 2 so that it cannot rotate or on a vehicle chassis (not shown) or a clutch housing (not shown).

With the aid of the electrical machine 8, the rotational energy of the drive shaft 4 can be converted into electrical energy via an electrical coupling of the electrical machine 8 to the drive shaft 4. For example, the electrical coupling is provided during a braking operation of the vehicle or continuously. The electrical energy obtained in this manner is supplied via an electrically conducting connection (20a, 20b) to the latent heat accumulator 18. There, with the aid of a heater resistor 24, the electrical energy is converted into thermal energy which is stored in the latent heat accumulator 18. Preferably, the heater resistor 24 is in direct contact with the accumulator 18 to facilitate the transfer of the thermal energy thereto. As required, the heat, which is stored in the latent heat accumulator 18, can be supplied to ancillary consumers 22, such as a heater for the passenger compartment or to a heater for preheating the engine 2, et cetera.

In addition to the latent heat accumulator 18, other stores can be provided which can be "filled up" by the electrical machine 8 as required. Furthermore, the electrical machine 8 can be used in a manner known per se for reducing rotation irregularities of the drive shaft 4 and as a starter for the engine 2, et cetera. In this connection, reference is again made to International patent publication WO 97/08438 wherein the possibilities of use of the electrical machine 8 are disclosed.

It is understood that the foregoing description is that of the preferred embodiments of the invention and that various changes and modifications may be made thereto without departing from the spirit and scope of the invention as defined in the appended claims.

What is claimed is:

1. A motor vehicle comprising:
   a drive shaft;
   an internal combustion engine for driving said motor vehicle via said draft shaft;
   a latent heat accumulator;
   an electrical machine;
   said drive shaft being mechanically connected to said electrical machine so as to permit said electrical machine to convert the mechanical energy of said drive shaft into electrical energy;
   means for conducting said electrical energy from said electrical machine to said latent heat accumulator; and,
   means for converting said electrical energy into thermal energy and for transferring said thermal energy to said latent heat accumulator.

2. The motor vehicle of claim 1, said conducting means being an electrically conducting connection providing a virtually loss-free transport of electrical energy from said electrical machine to said latent heat accumulator; and, said converting means including a heater resistor for converting said electrical energy to said thermal energy and said heater resistor being in direct contact with said latent heat accumulator to facilitate the transfer of said thermal energy thereto.

3. The motor vehicle of claim 2, wherein said electrical machine is utilized to reduce rotation irregularities of said drive shaft.

4. The motor vehicle of claim 2, wherein said electrical machine is used as a starter.

5. The motor vehicle of claim 2, wherein said electrical machine is used as a generator.

6. A method for charging a latent heat accumulator mounted in a motor vehicle having a drive shaft and an internal combustion engine for driving said vehicle via said drive shaft, the method comprising the steps of:
   providing said motor vehicle with an electrical machine which is electrically coupled to said drive shaft at least from time to time;
   braking said drive shaft with said electrical machine thereby converting mechanical energy into electrical energy;
   conducting said electrical energy to said latent heat accumulator; and,
   converting at least a portion of said electrical energy to thermal energy and transferring said thermal energy to said latent heat accumulator.

7. The method of claim 6, wherein said electrical machine is continuously electrically coupled to said drive shaft and is additionally used to reduce rotation irregularities of said drive shaft.

* * * * *

UNITED STATES PATENT AND TRADEMARK OFFICE
CERTIFICATE OF CORRECTION

PATENT NO. : 5,938,114
DATED : August 17, 1999
INVENTOR(S) : Klaus-Peter Zeyen, Thomas Pels, Klaus Revermann and Holger Riekenbrauck It is certified that error appears in the above-identified patent and that said Letters Patent is hereby corrected as shown below:

On the title page, in the abstract, line 7: delete "angle a" and substitute --angle α--therefor.
In column 6, line 39: delete "paid" and substitute --said-- therfor.
In column 6, line 67: delete "($d_l$) and" and substitute --($d_l$); and, --therfor.

Signed and Sealed this

First Day of May, 2001

Attest:

NICHOLAS P. GODICI

*Attesting Officer*   *Acting Director of the United States Patent and Trademark Office*